United States Patent Office 2,812,365
Patented Nov. 5, 1957

2,812,365

PROCESS OF PREPARING BIS-(3,5,6-TRICHLORO-2-HYDROXYPHENYL) METHANE

William S. Gump, Upper Montclair, Max Luthy, Ridgewood, and Henry G. Krebs, Clifton, N. J., assignors to The Givaudan Corporation, New York, N. Y., a corporation of New Jersey No Drawing. Continuation of abandoned application Serial No. 251,638, October 16, 1951. This application March 18, 1954, Serial No. 417,232

7 Claims. (Cl. 260—619)

This invention relates to an improved process for making bis-(3,5,6-trichloro-2-hydroxyphenyl) methane.

Bis-(3,5,6-trichloro-2-hydroxyphenyl) methane is a substance having desirable bactericidal and fungicidal properties. It may be employed to advantage in tooth pastes, ointments, creams, lotions, and rubber goods, inter alia. In addition, when incorporated in small amounts in soaps, it exhibits the surprising quality—for a phenolic substance—of rendering such soaps germicidal.

U. S. Patent 2,435,593, issued to two of us, discloses a method involving the use of oleum and very concentrated $H_2SO_4$ in the condensation of 2,4,5-trichlorophenol with a formaldehyde-yielding substance. While this process is satisfactory it has been found to be subject to improvements.

In accordance with this invention, we have found that the process of U. S. 2,435,593 can be improved so as to permit easier handling of the materials being treated, allow for better temperature control, afford a technically simple means to separate the desired product from the acid and other materials, and enable the unused acid to be recovered in concentrated form. Further, in the accomplishment of the foregoing improvements, our present improved process requires fewer manipulative steps than heretofore, and, consequently, enables the desired substance to be obtained more economically.

We believe that the two chief advantages of our present process are (1) the fact that the sulfuric acid used in our process can be recovered in concentrated marketable and/or usable form, and (2) the fact that the desired condensation product is obtained from a water suspension instead of by means of crystallization from solvents.

(1) Previous process resulted in the loss of sulfuric acid in the form of alkali metal sulfates or in the formation of dilute acid solutions. Such solutions are too dilute to be of commercial use and it is economically impractical to recover the acid therefrom. Furthermore, dilute acid solutions present an expensive and troublesome waste disposal problem, by reason of the legal requirements in many areas for the neutralization of acid solutions prior to their discharge into sewer systems.

In our process, we obtain a highly concentrated sulfuric acid, e. g., of about 90% concentration. This can easily be raised in strength and re-used or it can be sold as an article of commerce.

(2) Prior processes involved the need for crystalizing the desired condensation product from solvents. Such procedures have many shortcomings, particularly in plant operations. They are not efficient, as repeated crystallizations are required to yield a first crop, a second crop, etc. The purity of the second and later crops is not as high as that of the first crop, necessitating blending operations and in the case of the last crop even a re-crystallization. Solvent recovery systems are also needed in order to purify the solvent from time to time. Such systems add to the cost of the overall process by reason of the losses in solvent entailed and the cost of operating the recovery system. Furthermore, they do involve a danger risk.

On the other hand, our process involves a simple filtration of the desired condensation product from a water suspension, with its attendant advantages. A complete yield of product is obtained in one filtration. The purity of the product is high and uniform from batch to batch. Safety and savings in costs are two other attributes of our recovery procedure.

Briefly stated, our invention involves the finding that 2,4,5-trichloro-phenol and a formaldehyde-yielding substance react at elevated temperatures in the presence of concentrated sulfuric acid or oleum to give the aforementioned advantageous results if the reaction is conducted in the presence of certain halogenated hydrocarbon solvents. After the condensation reaction the sulfuric acid is easily removed since it forms the lower heavy layer. The upper or solvent layer, which contains substantially all of the desired reaction product, is decolorized, and added to water. The solvent is removed, preferably, at elevated temperatures as by live steam distillation, thereby also removing undesirable volatile impurities and causing the desired phenolic substance to form a suspension in the water. Finally the desired material is filtered, washed and dried to yield a marketable product.

Suitable solvents encompassed by this invention are perchloroethylene ($CCl_2=CCl_2$), chloroform, carbon tetrachloride, poly-halogenated derivatives of ethane and propane, such as ethylene dichloride, trichloroethane, tetrachloro ethane, 1,2-dichloro-propane and ethylene dibromide.

To indicate the unexpectedness of our finding it is noted that halogenated hydrocarbons with double bonds and an active hydrogen, such as trichloroethylene, as well as alkyl and aryl halides, and solvents such as benzene, toluene and methanol, are not operable. The term "active hydrogen" is used herein to designate H bound to a carbon atom which itself is united to another carbon atom by a double bond.

The formaldehyde-yielding materials and the condensation agents employed herein are the same as in U. S. 2,435,593, and are employed in substantially the same amounts.

The amount of halogenated hydrocarbon solvent employed herein may vary widely, but we prefer to use the minimum amount needed to insure that the reaction contents are in solution form throughout the condensation reaction.

The temperature may vary over a wide range but in general we prefer to operate the condensation reaction at from about 50° to 100° C., conducting the reaction under reflux conditions when conditions (e. g. boiling point of the solvent) permit.

The following examples are given for purposes of illustration and are not to be construed as limiting the scope of the invention.

*Example 1*

Five and eight tenths gram of paraformaldehyde are fed in the course of one hour to an agitated mixture of 70 grams of 2,4,5-trichlorophenol (M. P. 63° C. minimum), 125 ml. of ethylene dichloride and 32 grams of 20% oleum maintained at a temperature between 70 and 88° C. At the completion of the feeding of the paraformaldehyde, the temperature of the agitated mixture is raised to reflux temperature and maintained at reflux for one and one-half hours. Then 125 ml. of ethylene dichloride are slowly added to the refluxing mixture. Agitation is stopped and the heavy sulfuric acid layer is removed from the bottom. This acid layer is extracted twice with 62 ml. of ethylene dichloride (at 80° C.) each time. The acid layer is separated and after a small amount of ethylene dichloride is recovered by heating the acid to 100° C. under vacuum, the recovered sulfuric acid (analyzing approximately 90% $H_2SO_4$) is suitable for purification. The ethylene dichloride extracts are combined with the main portion of the ethylene dichloride solution and the resulting solution is decolorized with 3 grams of Filtrol or other similar types of decolorizing earths. After removing the Filtrol by filtration, at 80° C. or thereabout, 125 ml. of water are added to the clear solution. The ethylene dichloride and small amounts of volatile impurities are removed by live steam. The product suspended in water is filtered, washed, and dried. Approximately 67.5 to 70 grams of white odorless bis-(3,5,6-trichloro-2-hydroxyphenyl) methane with a melting point of 164 to 165° C. are obtained.

*Example 2*

A mixture of 50 g. of 2,4,5-trichlorophenol, M. P. 63.3°, 20 g. of oleum 20% and of 75 ml. of chloroform was heated to reflux under stirring. Paraformaldehyde (4.1 g.) was added in small portions during one hour at reflux temperature of the solvent, and after the addition of the paraformaldehyde, stirring and heating was continued for another hour.

The mixture was allowed to cool, then diluted with about 200 cc. of cold water and subjected to steam-distillation to remove the solvent and traces of unchanged trichlorophenol. The residue in the distilling flask was filtered, washed acid-free with water and dried.

Yield: 49 g. of the desired material in the form of a light-gray powder; M. P. 160–162° C. (corrected).

*Example 3*

The procedure of Example 2 was followed using 100 ml. of carbon tetrachloride instead of the chloroform, the reaction being conducted under reflux conditions. There was obtained 48.6 g. of the desired bis-(3,5,6-trichloro-2-hydroxyphenyl) methane in the form of a light gray powder having a corrected M. P. of 161–163° C.

*Example 4*

The procedure of Example 2 was repeated under reflux conditions, this time 75 ml. of trichloroethane being substituted for the chloroform used in Example 2. A yield of 49 g. of the desired product in the form of a light gray powder having a corrected M. P. of 162–163° C. was obtained.

*Example 5*

The procedure of Example 2 was repeated at a temperature of 80–85° C., this time 75 ml. of tetrachloroethane being used in place of the chloroform employed in Example 2. A yield of 45 g. of the desired product in the form of a dark gray powder having a corrected M. P. of 161–162.5° C. was obtained.

*Example 6*

The procedure of Example 2 was followed, using 75 ml. of perchloroethylene in place of the chloroform and a reaction temperature of 80–85° C. A yield of 49 g. of the desired product in the form of a light gray powder having a melting point of 161–163° C. was obtained.

*Example 7*

The procedure of Example 2 was followed, using 75 ml. of ethylene dibromide and a reaction temperature of 80–85° C. A yield of 49 g. of the desired product in the form of a light gray powder having a corrected M. P. of 163–164° C. was obtained.

This application is a continuation of our copending application, Ser. No. 251,638, filed October 16, 1951, later abandoned.

The foregoing illustrates the practice of this invention, which however, is not to be limited thereby but is to be construed as broadly as permissible in view of the prior art and limited solely by the appended claims.

We claim:

1. In the process for preparing bis-(3,5,6-trichloro-2-hydroxyphenyl) methane by condensing 2,4,5-trichlorophenol with a formaldehyde-yielding substance at elevated temperatures in the presence of a substance selected from the group consisting of sulfuric acid having at least about 93% $H_2SO_4$ content by weight and oleum, the improvement which comprises conducting the condensation reaction in the presence of a sufficient amount of at least one solvent selected from the group consisting of saturated polyhalogenated derivatives of methane, ethane and propane and the corresponding unsaturated polyhalogenated hydrocarbons which are free of hydrogen bound to a carbon atom which itself is united to another carbon atom by a double bond so as to maintain the condensation product substantially in solution in the solvent throughout the condensation reaction, separating the resulting lower layer which comprises a concentrated solution of sulfuric acid, adding water to the remaining solvent layer containing the reaction product, physically separating the solvent, and filtering the bis-(3,5,6-trichloro-2-hydroxyphenyl) methane from the resulting water suspension.

2. The process of claim 1, wherein a decolorizing earth is added to said remaining solvent solution of the reaction product and then filtered therefrom prior to said addition of water.

3. The process of claim 2 wherein the solvent employed is ethylene dichloride and the elevated temperatures are between about 70° and 88° C.

4. The process of claim 2 wherein the solvent employed is perchloroethylene and the elevated temperatures are between about 80 and 85° C.

5. The process of claim 2 wherein the solvent employed is chloroform and the condensation is conducted under atmospheric reflux conditions.

6. The process of claim 2 wherein the solvent employed is carbon tetrachloride and the condensation is conducted under atmospheric reflux conditions.

7. The process of claim 2 wherein the solvent employed is ethylene dibromide and the elevated temperatures are between 80° and 85° C.

References Cited in the file of this patent

UNITED STATES PATENTS

| Number | Name | Date |
|---|---|---|
| 1,978,949 | Kohn et al. | Oct. 30, 1934 |
| 2,250,480 | Gump | July 29, 1941 |
| 2,435,593 | Luthy et al. | Feb. 10, 1948 |
| 2,677,700 | Jackson et al. | May 4, 1954 |

FOREIGN PATENTS

| Number | Country | Date |
|---|---|---|
| 557,976 | Great Britain | Dec. 14, 1943 |